(12) United States Patent
Fiedler

(10) Patent No.: US 7,431,305 B2
(45) Date of Patent: *Oct. 7, 2008

(54) OIL SCRAPER RING RING GROOVE ARRANGEMENT FOR PISTONS OF INTERNAL COMBUSTION ENGINES

(75) Inventor: Rolf-Gerhard Fiedler, Wendlingen (DE)

(73) Assignee: Mahle GmbH, Stuttgart (DE)

( * ) Notice: Subject to any disclaimer, the term of this patent is extended or adjusted under 35 U.S.C. 154(b) by 132 days.

This patent is subject to a terminal disclaimer.

(21) Appl. No.: 10/570,105

(22) PCT Filed: Sep. 1, 2004

(86) PCT No.: PCT/DE2004/001940

§ 371 (c)(1),
(2), (4) Date: Jun. 7, 2006

(87) PCT Pub. No.: WO2005/022011

PCT Pub. Date: Mar. 10, 2005

(65) Prior Publication Data

US 2007/0017459 A1    Jan. 25, 2007

(30) Foreign Application Priority Data

Sep. 2, 2003    (DE) .............................. 103 40 313

(51) Int. Cl.
*F02F 5/00*    (2006.01)
(52) U.S. Cl. .................... 277/435; 277/451; 277/452

(58) Field of Classification Search ............... 277/435, 277/447, 449, 451–453, 455, 466
See application file for complete search history.

(56) References Cited

U.S. PATENT DOCUMENTS 2,938,758 A * 5/1960 Phillips ...................... 277/444

(Continued)

FOREIGN PATENT DOCUMENTS

DE        1 601 388        10/1970

(Continued)

*Primary Examiner*—Vishal Patel
(74) *Attorney, Agent, or Firm*—Collard & Roe, P.C.

(57) ABSTRACT

The invention relates to an oil scraper ring groove ring arrangement for pistons of internal combustion engines. The inventive arrangement comprises a disk that is provided with parallel flanks and a bearing surface having an asymmetrical crowned form with a vertex line extended over the periphery of the disc, with the disk being arranged in a ring groove of the piston with a ring groove side opposing the piston head and a ring groove side facing the piston head. The aim of the invention is to achieve an improved oil scraping action compared to that of prior art, while reducing the friction and the abrasion in such a way that it is radially outwardly inclined to the outer diameter of the piston, the bearing surface of the disk being embodied in such a way that it corresponds to an almost worn end contour in the started engine state, and, when the oil scraper ring is mounted in the piston, the vertex line of the bearing surface is oriented in the direction of the ring groove side opposing the piston head.

7 Claims, 2 Drawing Sheets

U.S. PATENT DOCUMENTS

| | | | |
|---|---|---|---|
| 3,174,762 A | 3/1965 | Hesling et al. | |
| 3,831,952 A * | 8/1974 | Geffroy | 277/447 |
| 3,862,480 A | 1/1975 | Packard et al. | |
| 3,926,444 A * | 12/1975 | Gripe et al. | 277/448 |
| 4,362,136 A * | 12/1982 | Lipp | 123/193.6 |
| 5,490,445 A | 2/1996 | Rao et al. | |
| 7,261,301 B2 * | 8/2007 | Fiedler | 277/434 |
| 7,306,232 B2 * | 12/2007 | Fiedler | 277/434 |

FOREIGN PATENT DOCUMENTS

| | | |
|---|---|---|
| DE | 1 776 219 | 1/1973 |
| DE | 2 421 736 | 12/1974 |
| DE | 33 05 385 C | 3/1984 |
| DE | 34 28 007 A1 | 2/1986 |
| DE | 38 33 322 A1 | 12/1989 |
| DE | 43 00 531 C | 2/1994 |
| DE | 195 04 786 | 9/1995 |
| DE | 44 29 649 A | 2/1996 |
| DE | 199 08 542 | 8/2000 |
| EP | 0 069 175 A1 | 1/1983 |
| EP | 1 184 558 A1 | 3/2002 |
| FR | 913.176 | 7/1952 |
| GB | 1 434 439 | 5/1976 |
| JP | 57044755 A | 3/1982 |
| JP | 57-73340 | 5/1982 |
| JP | 08121242 A | 5/1996 |
| JP | 200008946 A | 1/2000 |
| JP | 2002323133 A | 11/2002 |

* cited by examiner

OIL SCRAPER RING RING GROOVE ARRANGEMENT FOR PISTONS OF INTERNAL COMBUSTION ENGINES

TITLE OF THE INVENTION CROSS REFERENCE TO RELATED APPLICATIONS

Applicant claims priority under 35U.S.C. §119of German Application No. 103 40 313.2filed Sep. 2, 2003. Applicant also claims priority under 35U.S.C. §365of PCT/DE2004/ 001940filed Sep. 1, 2004. The international application under PCT article 21(2) was not published in English. 1.BACKGROUND OF THE INVENTION 2.Field of the invention The invention relates to an oil wiping ring ring groove arrangement for pistons of internal combustion engines, having a lamella provided with parallel walls, whose working surface has a barrel-shaped asymmetrical shape, having a vertex line that extends over the circumference of the lamella, whereby the lamella is disposed in a ring groove of the piston, having one ring groove wall facing away from the piston crown side and one ring groove wall facing the piston crown side.

In order to prevent too much motor oil from getting into the combustion chamber, which not only results in high oil consumption but also has negative effects on the emission behavior of the engine, a sufficient tangential force of the oil wiping rings is required to produce a radial contact pressure against the cylinder wall and thereby a good oil wiping effect. However, this results in a high surface pressure against the working surfaces of the steel lamellae, and therefore also a high friction power during engine operation. This friction power worsens the degree of effectiveness of the internal combustion engine and accordingly increases the fuel consumption. The design of the tangential force of the oil wiping rings is therefore always a compromise between minimal friction power and maximal oil wiping effect. All of the measures for reducing the friction power during engine operation, without reducing the tangential force, thereby facilitate the design of the oil wiping rings, i.e. improve the degree of effectiveness of the engine.

Accordingly, an attempt was made, for oil wiping rings of the type stated, to shape the working surfaces of the lamellae in such a manner that these meet the aforementioned requirements.

Prior Art

Asymmetrical working surfaces of oil wiping rings or piston rings are known from DE 38 33 322 A1, DE 43 00 531 C1, or DE 44 29 649 C2. Likewise, a piston ring is known from DE 33 05 385 C1, which is disposed in a ring groove of a piston, the ring groove side walls of which run preferably parallel, but at a slant to the piston axis, in order to guarantee a better seal. Ring groove side walls that are oriented at a slant and parallel to one another are also known from the Japanese utility model 57-73340. These previously known embodiments, however, relate to compression rings, whose requirements with regard to surface pressure are very low, while oil wiping rings demand great surface pressures.

SUMMARY OF THE INVENTION

It is the task of the invention to indicate an oil wiping ring ring groove arrangement for a piston of an internal combustion engine, with which an improved oil wiping effect as compared with the known state of the art, at reduced friction and a reduced wear of the working surface of the oil wiping ring, is achieved.

This task is accomplished by means of an oil wiping ring ring groove arrangement in which at least one of the ring groove walls runs at a slant radially outward up to the outside piston diameter, at an angle to the piston axis, whereby preferably, the ring groove wall that faces away from the piston crown side is disposed at a slant away from the piston crown. The working surface of the lamella is configured in such a manner that it corresponds to an almost worn end contour in the run-in engine state, whereby in the assembled state of the oil ring in the piston, the vertex line of the working surface is disposed towards the ring groove wall that faces away from the piston crown side.

The working surface of the lamella is characterized by an asymmetrical incline having a greatly reduced barrel shape as compared with the state of the art, whereby the working surface contour can be approximately described by means of a polynomial of the second order.

In another embodiment of the invention, the two ring groove walls are disposed at an angle relative to the piston axis, radially outward to the outside piston diameter, slanted in such a manner that the ring groove wall facing away from the piston crown side is slanted away from the piston crown, and the ring groove wall that faces the piston crown side runs at a slant towards the piston crown.

By means of the working surface configuration according to the invention, and the placement of the lamella in the ring groove configured according to the invention, a reduction in the friction power of the oil wiping ring is achieved, by means of more advantageous hydrodynamic conditions at the lamella, without any reduction in tangential force, as a function of the stroke movement of the piston, whereby the oil wiping function is maintained to its full extent, with the change in the stroke movement of the piston. The reduction in the friction power results in an improvement of the degree of effectiveness of the engine, or the oil wiping behavior can be improved by means of an increase in the tangential force, with an unchanged friction power level.

As compared with conventional oil wiping ring arrangements, the spreading spring can therefore be eliminated, so that the production effort and the production costs can be reduced. Furthermore, a reduction in the axial height of the total ring package can be achieved, as compared with ring packages according to the state of the art.

Practical embodiments of the invention are the subject of the dependent claims.

BRIEF DESCRIPTION OF THE DRAWINGS

An exemplary embodiment of the invention is described below, using the drawings. These show FIG. 1 a cross-section of the oil wiping ring ring groove arrangement according to the invention, in a stroke movement of the piston directed away from the combustion chamber.

DETAILED DESCRIPTION OF THE DRAWINGS

Figure 1:
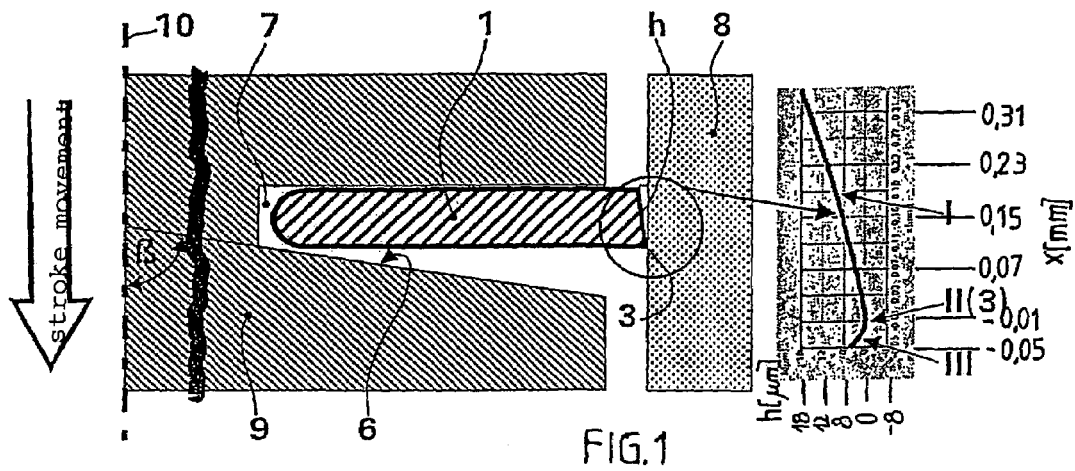
Figure 2:
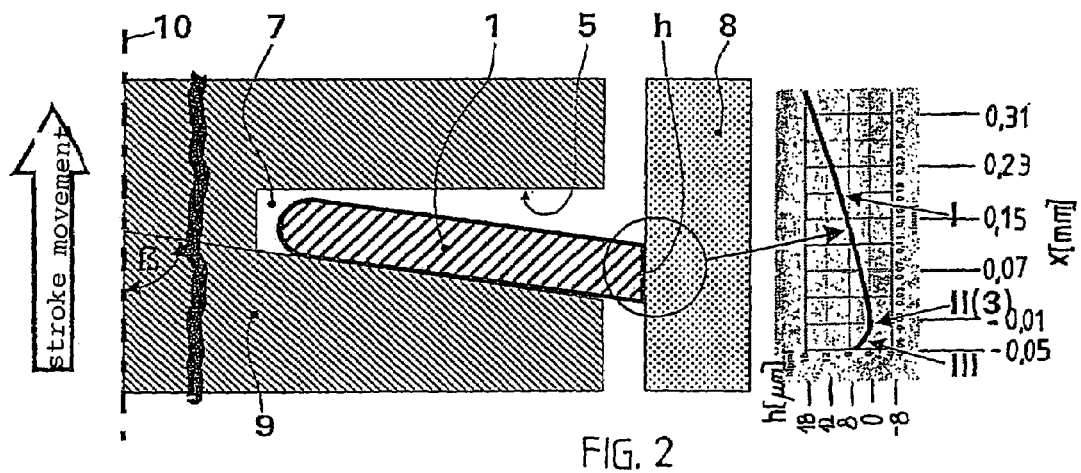
FIG. 2 a cross-section of the oil wiping ring ring groove arrangement according to the invention, in a stroke movement of the piston that is directed opposite that according to FIG. 1.

As is evident from FIGS. 1 and 2, an oil wiping ring ring groove arrangement consists of a lamella 1 having parallel walls and a working surface h. The lamella 1 is disposed in a ring groove 7 of a piston 9, and is oriented with its working surface h towards the cylinder wall 8 of the engine. A ring groove wall 5 represents the side of the ring groove 7 on the piston crown side, and a ring groove wall 6 represents the side that faces away from the piston crown. According to the invention, the ring groove wall 5 on the piston crown side is disposed oriented at an angle of 90° relative to the piston axis 10, whereby the ring groove wall 6 that faces away from the piston crown runs at an angle β of 85° to 87° up to the outside piston circumference.

Figure 4:
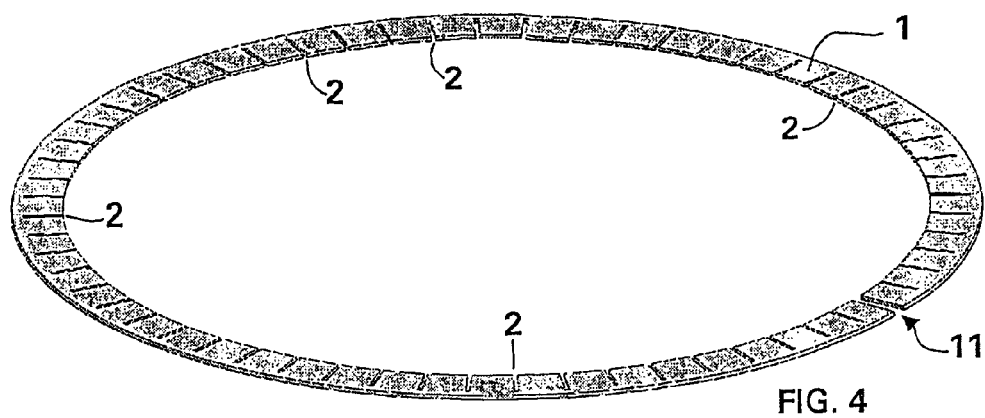
FIG. 4 a perspective view of the oil wiping ring according to the invention.

According to the oil wiping ring ring groove arrangement, the lamella 1 has a barrel-shaped asymmetrically shaped working surface h with a vertex line 3 that extends over the circumference of the lamella, whereby the vertex line 3 acts for oil wiping, as an edge that stands in contact with the cylinder wall 8. According to FIG. 1, the lamella 1 is disposed in the piston, in its assembled state, in such a manner that its vertex line 3 (edge) is disposed towards the ring groove wall 6 that faces away from the piston crown side. As shown in FIG. 4, the ring joint 11 can be closed, in order to increase the radial bias, whereby the oil wiping ring has corresponding slits 2, configured radially.

According to the invention, the working surface h of the lamella has a shape that corresponds to a run-in process of several hundred hours of engine operation. This is characterized in that the working surface h of the lamella 1, in cross-section, follows the asymmetrical shape of a polynomial of the second order in a first segment (I), with $h(x)=ax+bx^2$, whereby x= working surface coordinates in the Cartesian coordinate system in mm, and a, b are coefficients, with a being defined by the ratio of the axial wall play of the lamella relative to the width of the lamella; b being defined as the amount of the working surface curvature; a supporting vertex (II) $h(x=0)$ configured as an edge, and in a third segment (III) follows the asymmetrical shape of the function $h(x)=cx^2$, with c as a multiple of b. As an example for a lamella having a thickness of 0.4 mm, a value $h(x)=35x+50x^2$ is obtained. With this, the cross-section curves shown in accordance with FIGS. 1 and 2 can be achieved, with x as the working surface coordinate in mm, and h(x) as the barrel shape in μm. It is understandable that the coefficients of this polynomial must be coordinated with the specific application, whereby essential parameters in this connection are the cylinder diameter, the dimensions of the lamella cross-section, and the axial play ratios of the installed oil wiping ring in the ring groove. The typical barrel shape of the working surface h according to the invention amounts to approximately 2 to 10 μm/0.4 mm, according to the invention, as compared with the embodiments according to the state of the art of 3 to 15 μm/0.15 mm.

Figure 3:
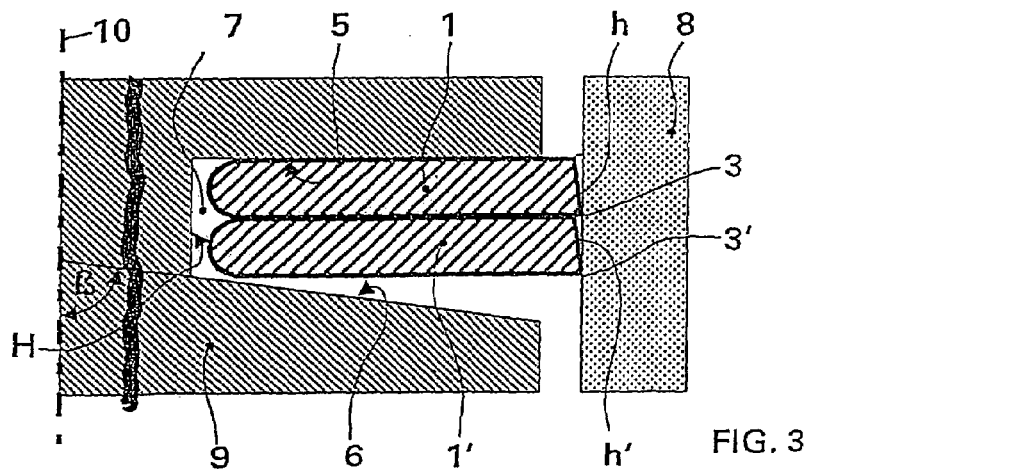
FIG. 3 a cross-section of an oil wiping ring ring groove arrangement having two oil wiping rings.

According to another exemplary embodiment according to FIG. 3, not only a first lamella 1 but also a second lamella 1'—both of them stacked loosely on top of one another with their walls—is disposed in the ring groove 7 with a ring groove base height H adapted in accordance with the lamella heights, so that an angle β of preferably 85° to 87° degrees of angle is formed between the piston axis and the ring groove wall 6 that faces away from the piston crown side. In this exemplary embodiment, both of the vertex lines 3, 3' (edges) are disposed facing away from the ring groove wall 5 on the piston crown side.

Figure 5:
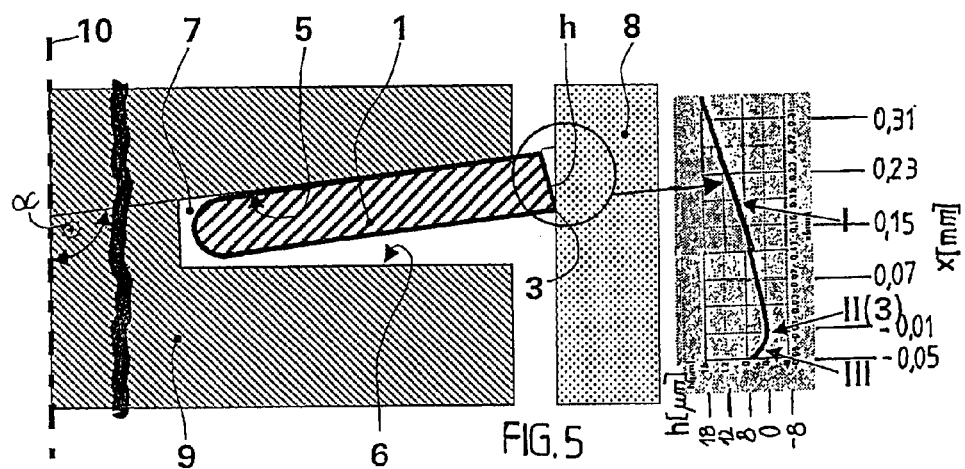
FIG. 5 a cross-section of a second embodiment of an oil wiping ring ring groove arrangement.
Figure 6:
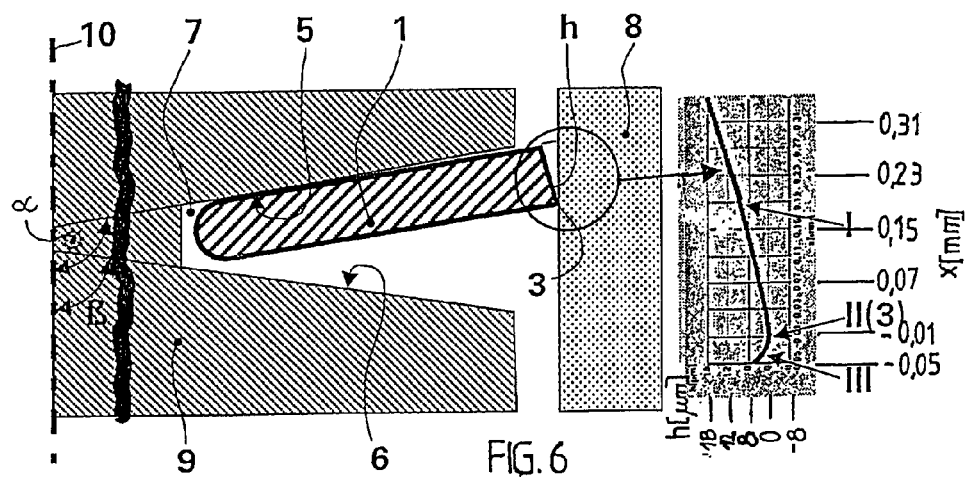
FIG. 6 a cross-section of a third embodiment of an oil wiping ring ring groove arrangement.

According to another exemplary embodiment according to FIG. 5, the ring groove wall 5 of the ring groove 7, on the piston crown side, is configured to be inclined at an angle of α, or, as shown in FIG. 6, both ring groove walls 5 and 6 are disposed inclined radially outward up to the outside piston diameter at the angles α and β, relative to the piston axis 10, in such a manner that the ring groove wall 6 that faces away from the piston crown side is slanted away from the piston crown, and the ring groove wall 5 that faces the piston crown runs at a slant towards the piston crown. In this connection, the angle α preferably amounts to 93° to 98° degrees, while the angle β, as explained in the first exemplary embodiment, preferably amounts to 85° to 87° degrees.

Functionally, the oil wiping effect that is improved according to the invention results from the fact that the friction force that engages on the working surface h of the lamella in the cylinder axis direction generates a torque that causes the lamella to arch in plate shape. This is possible because the configuration of the V-shaped ring groove 7 prevents a movement of the lamella in the axial direction, particularly at the inner contact point, whereas clearly greater axial movement amplitudes are possible at the outer contact point. The friction force, and therefore the torque, changes its sign as a function of the stroke direction of the piston. Since the amount of the friction force is still dependent on velocity, this results in constant changes in the plate-shaped arch, referred to as dynamic twist. Because of the dynamic twist, the lamella that rests against the groove wall that faces the piston head during the stroke away from the combustion chamber—the down stroke—in combination with the asymmetrical incline of the working surface, produces a good oil wiping effect—the "edge" works—as shown in FIG. 1, while the other position of the lamella, in each instance, has improved hydrodynamics because of the defined barrel shape of the working surface during the up stroke—the "surface" (segment I) works—as shown in FIG. 2. In this way, the friction power at the lamella, which has a worse oil wiping effect in the twisted state, is reduced. A change in the stroke direction causes the lamella to flip over into the other position, in each instance.

Attention must be paid to ensure orientation of the lamella in the correct position when the oil wiping ring is installed into the cylinder of the engine; this can be guaranteed, for example, by means of color markings on one of the lamella walls.

The production of the working surface shape, i.e. contour can take place by means of lapping, for example.

REFERENCE SYMBOLS 1, 1' lamella, oil wiping ring
2 slits
3, 3' vertex line (edge)
5 ring groove wall facing the piston crown side
6 ring groove wall facing away from the piston crown side
7 ring groove
8 cylinder wall
9 piston
10 piston axis
11 joint, total free gap
H, h' working surfaces
H groove base height of the ring groove

The invention claimed is:

1. A sealing arrangement for pistons of internal combustion engines having an oil wiping ring and a ring groove, the sealing arrangement having a lamella (1) provided with parallel walls, whose working surface (h) has a barrel-shaped asymmetrical shape, having a vertex line (3) that extends over the circumference of the lamella, whereby the lamella is disposed in a ring groove (7) of the piston, having one ring groove wall (6) facing away from the piston crown side and one ring groove wall (5) facing the piston crown side, wherein at least one of the ring groove walls (5, 6) runs at a slant radially outward up to the outside piston diameter, at an angle ($\alpha$, $\beta$) relative to the piston axis (10), the working surface (h) of the lamella (1) is configured in such a manner that it corresponds to an almost worn end contour in the run-in engine state, and in cross-section, comprises a first segment (I) following the asymmetrical shape of a polynomial of the second order in. with $h(x)=ax+bx^2$, whereby x=working surface coordinates in the Cartesian coordinate system in mm, and a, b are coefficients, with a being defined by the ratio of the axial wall play of the lamellae relative to the width of the lamellae; b being defined as the amount of the working surface curvature;

a supporting vertex (II) $h(x=0)$ configured as an edge, and a third segment (III) following the asymmetrical shape of the function $h(x)=cx^2$, with c as a multiple of b and in the assembled state of the oil wiping ring (1) in the piston, the vertex line (3) of the working surface (h) is disposed towards the ring groove wall (6) that faces away from the piston crown side.

2. The sealing arrangement according to claim 1 wherein the ring groove wall (6) facing away from the piston crown side runs at a slant away from the piston crown, at an angle ($\beta$).

3. The sealing arrangement according to claim 1, wherein the ring groove wall (5) facing the piston crown side runs at a slant towards the piston crown, at an angle ($\alpha$). The sealing 4. arrangement according to claim 1, wherein two lamellae (1, 1') are disposed lying loosely on top of one another in the ring groove (7) with a ring groove base height (H), whereby the ring groove base height is configured in such a manner that the angle ($\beta$) assumes a value according to the arrangement according to claim 1.

5. The sealing arrangement according to claim 4, wherein both of the vertex lines (3, 3') are disposed facing towards the ring groove wall (6) facing away from the piston crown side.

6. The sealing arrangement according to claim 2, wherein the angle $\alpha$ comprises a value of 93 to 98 degrees of angle, and the angle $\beta$ comprises a value of 85 to 87 degrees of angle.

7. A sealing arrangement for pistons of internal combustion engines having an oil wiping ring and a ring groove, the sealing arrangement having a lamella (1) provided with parallel walls, whose working surface (h) has a barrel-shaped asymmetrical shape, having a vertex line (3) that extends over the circumference of the lamella, whereby the lamella is disposed in a ring groove (7) of the piston, having one ring groove wall (6) facing away from the piston crown side and one ring groove wall (5) facing the piston crown side, wherein at least one of the ring groove walls (5) runs at a slant radially outward up to the outside piston diameter at an angle a relative to the piston axis (10), the angle a comprising a value of 93 to 98 degrees, the ring groove wall (6) facing away from the piston crown side runs at a slant away from the piston crown at an angle $\beta$ comprising a value of 85 to 87 degrees, the working surface (h) of the lamella (1) is configured in such a manner that it corresponds to an almost worn end contour in the run-in engine state, and in cross-section, comprises a first segment (I) following the asymmetrical shape of a polynomial of the second order in, with $h(x)=ax+bx^2$, whereby x=working surface coordinates in the Cartesian coordinate system in mm, and a, b are coefficients, with a being defined by the ratio of the axial wall play of the lamellae relative to the width of the lamellae; b being defined as the amount of the working surface curvature;

a supporting vertex (TI) $h(x=0)$ configured as an edge, and a third segment (III) following the asymmetrical shape of the function $h(x)=cx^2$, with c as a multiple of b and in the assembled state of the oil wiping ring (1) in the piston, the vertex line (3) of the working surface (h) is disposed towards the ring groove wall (6) that faces away from the piston crown side.

* * * * *